United States Patent
Odejerte, Jr. et al.

(10) Patent No.: US 10,239,490 B2
(45) Date of Patent: Mar. 26, 2019

(54) SYSTEM AND METHOD FOR COMMUNICATING WITH A VEHICLE

(71) Applicant: Huf North America Automotive Parts Manufacturing Corp., Milwaukee, WI (US)

(72) Inventors: Antonio Odejerte, Jr., Farmington Hills, MI (US); John Nantz, Brighton, MI (US); Matthew R. Honkanen, Waterford, MI (US)

(73) Assignee: HUF NORTH AMERICA AUTOMOTIVE PARTS MFG. CORP., Milwaukee, WI (US)

( * ) Notice: Subject to any disclaimer, the term of this patent is extended or adjusted under 35 U.S.C. 154(b) by 3 days.

(21) Appl. No.: 15/888,193

(22) Filed: Feb. 5, 2018

(65) Prior Publication Data

US 2018/0222445 A1    Aug. 9, 2018

Related U.S. Application Data

(60) Provisional application No. 62/456,365, filed on Feb. 8, 2017.

(51) Int. Cl.
| | | |
|---|---|---|
| *B60R 25/24* | (2013.01) | |
| *H04W 52/02* | (2009.01) | |
| *H04W 4/40* | (2018.01) | |
| *H04W 4/02* | (2018.01) | |
| *H04W 4/80* | (2018.01) | |
| *H04W 4/44* | (2018.01) | |

(52) U.S. Cl.
CPC ............... *B60R 25/24* (2013.01); *H04W 4/40* (2018.02); *H04W 52/028* (2013.01); *H04W 52/0258* (2013.01); *B60R 2325/101* (2013.01); *B60R 2325/205* (2013.01); *H04W 4/023* (2013.01); *H04W 4/44* (2018.02); *H04W 4/80* (2018.02); *Y02D 70/00* (2018.01); *Y02D 70/10* (2018.01); *Y02D 70/14* (2018.01); *Y02D 70/142* (2018.01); *Y02D 70/144* (2018.01); *Y02D 70/166* (2018.01); *Y02D 70/20* (2018.01); *Y02D 70/26* (2018.01)

(58) Field of Classification Search
CPC .............. B60R 25/24; B60R 2325/101; B60R 2325/205; B60W 50/0098; B60W 40/08; B60W 2540/28; B60W 2710/30
See application file for complete search history.

(56) References Cited

U.S. PATENT DOCUMENTS

| | | | | |
|---|---|---|---|---|
| 5,966,084 A | * | 10/1999 | Lumbis | ............... B61L 15/0036 104/88.03 |
| 6,370,452 B1 | * | 4/2002 | Pfister | .................. G05D 1/0297 701/23 |
| 8,989,053 B1 | * | 3/2015 | Skaaksrud | ............ H04W 12/06 370/255 |

(Continued)

*Primary Examiner* — Thomas D Alunkal
(74) *Attorney, Agent, or Firm* — Honigman LLP; Matthew H. Szalach; Jonathan P. O'Brien

(57) ABSTRACT

A communication system includes a control module, a primary wireless communication node, and a plurality of secondary wireless communication nodes. The primary wireless communication node is in communication with the control module. The primary wireless communication node is in communication with each of the plurality of secondary wireless communication nodes through a common communication line.

22 Claims, 7 Drawing Sheets

(56) References Cited

U.S. PATENT DOCUMENTS

| | | | | |
|---|---|---|---|---|
| 2004/0003153 A1* | 1/2004 | Froeschl | ........... | H04L 12/40169 |
| | | | | 710/104 |
| 2009/0021955 A1* | 1/2009 | Kuang | ............... | H05B 33/0803 |
| | | | | 362/479 |
| 2016/0129916 A1* | 5/2016 | Olsen | .................... | B60W 40/08 |
| | | | | 701/36 |

* cited by examiner

SYSTEM AND METHOD FOR COMMUNICATING WITH A VEHICLE

CROSS REFERENCE TO RELATED APPLICATION

This application claims priority under 35 U.S.C. § 119(e) to U.S. Provisional Application 62/456,365, filed on Feb. 8, 2017, the disclosure of which is hereby incorporated by reference in its entirety.

FIELD

The present disclosure relates generally to a system and method for communicating with a vehicle.

BACKGROUND

This section provides background information related to the present disclosure and is not necessarily prior art.

A wireless communication device, such as a key fob, a smartphone, a smart watch, or a computer (e.g., a tablet, laptop, personal digital assistant, etc.), for example, can be used to communicate with a motor vehicle. For example, a wireless communication device can communicate with a vehicle in order to access, diagnose faults, start/stop, and/or provide power to certain components and/or systems within the vehicle. In particular, a user may utilize a wireless communication protocol (e.g., short-range radio wave communication, Wi-Fi, BLUETOOTH®, near field communication (NFC), etc.) to access and/or operate the vehicle. In this regard, the operator may access and/or operate the vehicle by utilizing a wireless communication protocol controlled and powered by a smartphone.

While known systems and methods for communicating between a wireless communication device and a vehicle have proven acceptable for their intended purposes, such systems may be susceptible to undesirable operating characteristics.

SUMMARY

This section provides a general summary of the disclosure, and is not a comprehensive disclosure of its full scope or all of its features.

According to one aspect, a communication system is provided. The communication system may include a control module, a primary wireless communication node, and a plurality of secondary wireless communication nodes. The primary wireless communication node may be in communication with the control module. The primary wireless communication node may be in communication with each of the plurality of secondary wireless communication nodes through a common communication line.

In some implementations, the primary and secondary wireless communication nodes include Bluetooth Low Energy communication nodes.

In some implementations, the common communication line includes a local interconnect network communication line.

In some implementations, the primary communication node is in communication with the control module via a controller area network communication protocol.

In some implementations, the primary wireless communication node is configured to communicate with a vehicle access device having identification information. The primary wireless communication node may be configured to transmit the identification information to each of the secondary wireless communication nodes through the common communication line. The communication system may also include a gateway module in communication with the primary wireless communication node and the control module. The vehicle access device may include at least one of a key fob or a phone. The gateway module may be in communication with the control module through a controller area network communication protocol. In some implementations, the control module includes a body control module, and the system further comprises a telematics control module configured to communicate with the control module and the gateway module.

According to another aspect, a method is provided. The method may include determining a connection status between a vehicle access device and a vehicle. The vehicle may include a primary communication node, a plurality of secondary communication nodes, and a control module. The primary communication node may be in communication with the plurality of secondary communication nodes through a common communication line. The method may also include transmitting identification information corresponding to the vehicle access device from the primary communication node to the secondary communication nodes through the common communication line based on whether the vehicle access device and the vehicle are in a connected state. The method may further include storing the identification information in a memory of at least one of the plurality of secondary communication nodes based on whether the vehicle access device and the vehicle are in a connected state. The method may also include removing the identification information from the memory of the at least one secondary communication node based on whether the vehicle access device and the vehicle are in a disconnected state.

In some implementations, the primary communication node and the plurality of secondary communication nodes include a Bluetooth Low Energy communication node.

In some implementations, the primary communication node is in communication with the control module.

In some implementations, the primary communication node is in communication with the control module via a controller area network communication protocol.

In some implementations, the primary communication node is in communication with the plurality of secondary communication nodes via a local interconnect network communication protocol.

In some implementations, the method includes transmitting, from one or more of the at least one secondary communication node to the primary communication node, a signal acknowledging removal of the identification information from the memory of the at least one secondary communication node.

In some implementations, the method includes storing the identification information in a memory of the primary communication node prior to storing the identification information in the memory of the at least one of the plurality of secondary communication nodes.

In some implementations, the method includes determining whether the vehicle access device is within a predetermined distance of the vehicle, activating the at least one of the plurality of secondary communication nodes based on whether the vehicle access device is within the predetermined distance of the vehicle, and transmitting, from the at least one of the plurality of secondary communication nodes to the primary communication node, a signal acknowledging activation of the at least one of the plurality of secondary communication nodes. The method may also include instructing, with the primary communication node, the at least one of the plurality of secondary communication nodes to scan for the vehicle access device. The method may further include receiving, with the at least one of the plurality of secondary communication nodes, received single strength indication values corresponding to the vehicle access device, transmitting, from the at least one of the plurality of secondary communication nodes to the primary communication node, filtered received single strength indication values, and determining, with the primary communication node, a location of the vehicle access device.

Bluetooth Low Energy (BLE) may be used as a wireless communication medium to access a vehicle. A vehicle access device, such as a mobile phone or a BLE based keyfob may be utilized to access the vehicle. Communication between a cloud-based data center (backend) and a telematics control unit may be through cellular wireless communication. Communication from the telematics control unit to a gateway module may be through a controller area network. Communication between the gateway module, a body control module, and a primary BLE node may be through a controller area network or any other communication medium. In some implementations, a local interconnect network or a similar communication medium connects the primary BLE node to the body control module. The communication medium between a plurality of secondary BLE nodes and the primary BLE node can either be wireless or wired.

In some implementations, the system may include less than five secondary communication nodes and one primary communication node. In some implementations, the system identifies the approximate location of the vehicle access device with respect to the vehicle. The primary BLE node may be connected to the body control module, the telematics control unit (in-direct or directly) and the gateway module.

The primary and secondary BLE nodes may be placed in strategic locations in the vehicle. Different vehicle may have a different location for the primary and secondary BLE nodes. A group of secondary BLE nodes may be connected to the primary BLE node in one or two local interconnect/wired networks for example, resulting in a lower cost, less complex, more robust, and more secure communication system. The primary and secondary BLE nodes may only be responsible for determining a location of the vehicle access device. In this regard, the primary and secondary BLE nodes may not decrypt or encrypt the contents of the BLE packets received from the vehicle access device. In some implementations, the primary and secondary BLE nodes may perform a basic BLE security operation such as securing a BLE channel when the vehicle access device is connected to, or otherwise in communication with, the vehicle. This means that a BLE related key may also be stored on the primary BLE node.

The primary and secondary BLE nodes may act as a pass-through for BLE communication between the vehicle access device and the vehicle (e.g., the control module) that is responsible for decrypting/encrypting the contents of the BLE packets received from the vehicle access device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1:
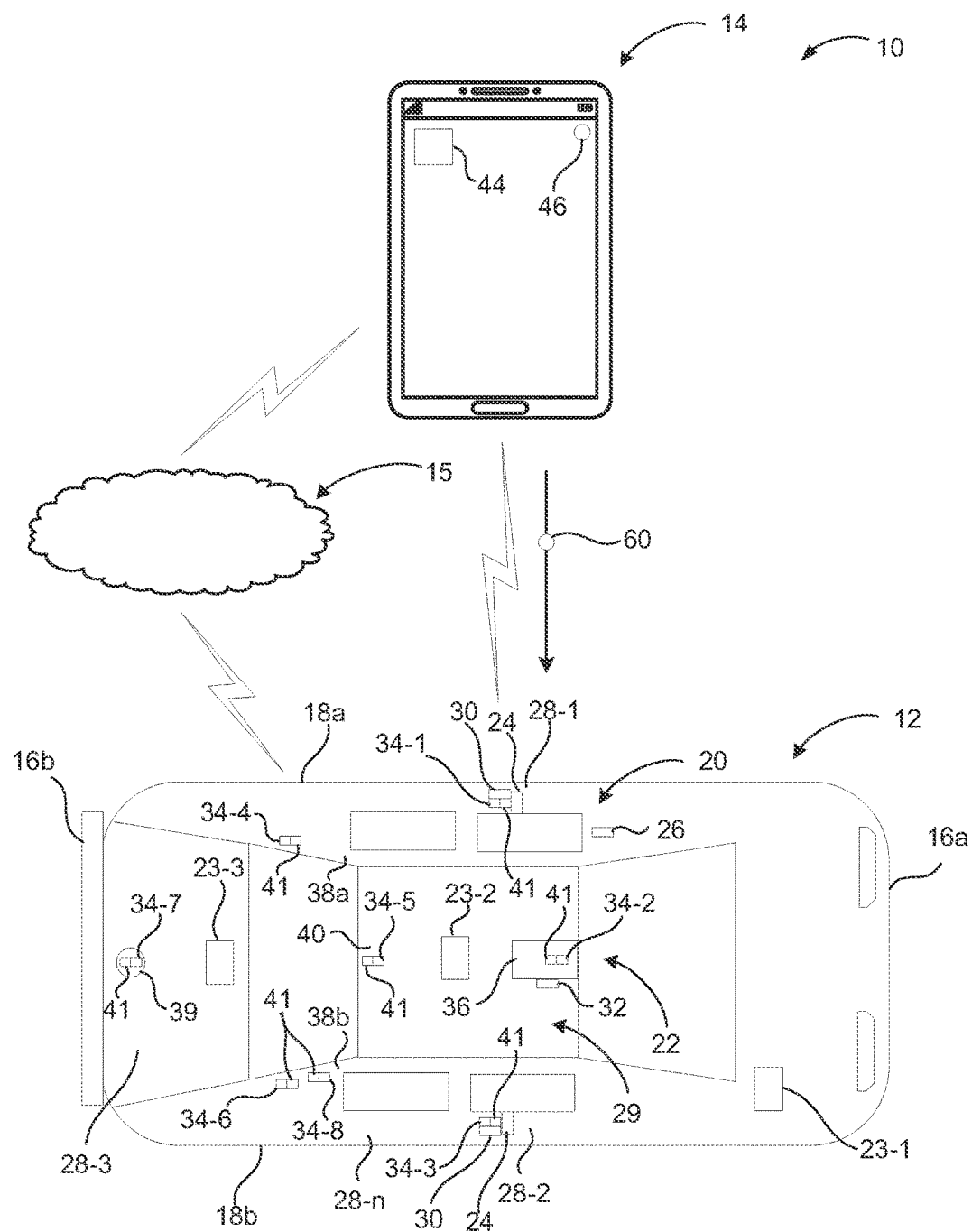
FIG. 1 is a functional block diagram of an example vehicle communication system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

The description provided herein is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

With reference to FIG. 1, a vehicle communication system 10 is provided. The vehicle communication system 10 may include a vehicle 12, one or more vehicle access device(s) 14, and a cloud-based data center 15. The vehicle 12 may be any known variety of motorized vehicle, such as a car, truck, or van, for example, having a front end 16a, a rear end 16b opposite the front end 16a, a driver's side 18a, and a passenger's side 18b opposite the driver's side 18a.

The vehicle 12 may include an access system 20, a communication system 22, a body control module 23-1, wireless gateway module 23-2, and a telematics control module 23-3. The access system 20 may include one or more locks 24, a lock control module 26, and one or more doors 28-1, 28-2, . . . 28-n and/or other access location(s). The locks 24 may permit and/or prevent access to a cabin portion 29 of the vehicle 12 through the doors 28-1, 28-2, . . . 28-n. For example, each door 28-1, 28-2, . . . 28-n of the vehicle 12 may include a lock 24 and a handle 30. The lock control module 26 may communicate with the lock(s) 24 to permit and/or prevent operation of the handle 30 in order to permit and/or prevent access to the vehicle 12 through the doors 28-1, 28-2, . . . 28-n. In this regard, the lock control module 26 may receive a signal from the communication system 22 to control a state (e.g., locked or unlocked) of the lock(s) 24 based on the signal(s) received from the vehicle access device 14.

The communication system 22 may include a communication application 32, a first communication node 34-1, a second communication node 34-2, a third communication node 34-3, a fourth communication node 34-4, a fifth communication node 34-5, a sixth communication node 34-6, a seventh communication node 34-7, and an eighth communication node 34-8. It will be appreciated that the communication system 22 may include more or less than eight communication nodes within the scope of the present disclosure. In this regard, the number of communication nodes may depend on the size, shape, or other configuration of the vehicle 12. In some implementations, the communication system 22 may include less six communication nodes.

As will be explained in more detail below, each communication node 34-1, 34-2, 34-3, 34-4, 34-5, 34-6, 34-7, 34-8 may communicate with other(s) of the communication nodes 34-1, 34-2, 34-3, 34-4, 34-5, 34-6, 34-7, 34-8 and/or with the vehicle access device 14. For example, the communication nodes 34-1, 34-2, 34-3, 34-4, 34-5, 34-6, 34-7, 34-8 may communicate with one another, and with the vehicle access device 14, through one or more wired and/or wireless communication protocols, such as Local Interconnect Network (LIN) Communication, Controller Area Network (CAN) communication, K-Line communication, short-range radio wave communication, Wi-Fi, BLUETOOTH®, and/or BLUETOOTH® low energy (BLE) (e.g., Mesh BLE or scatternet BLE). In some implementations, the communication nodes 34-1, 34-2, 34-3, 34-4, 34-5, 34-6, 34-7, 34-8 may be BLE nodes. In this regard, the communication nodes 34-1, 34-2, 34-3, 34-4, 34-5, 34-6, 34-7, 34-8 may be referred to herein as BLE communication nodes 34-1, 34-2, 34-3, 34-4, 34-5, 34-6, 34-7, 34-8.

As illustrated in FIG. 1, the communication nodes 34-1, 34-2, 34-3, 34-4, 34-5, 34-6, 34-7, 34-8 may be disposed at various locations on and/or in the vehicle 12. In this regard, the precise location of each of the communication nodes may depend on the size, shape, or other configuration of the vehicle 12. In some implementations, the first, third, fourth, sixth, and seventh communication nodes 34-1, 34-3, 34-4, 34-6, 34-7 are disposed on an exterior portion of the vehicle, while the second, fifth, and eighth communication nodes 34-2, 34-5, 34-8 are disposed in an interior portion (e.g., cabin portion 29) of the vehicle. For example, the first communication node 34-1 may be disposed on the driver's side 18a of the vehicle 12. In some implementations, the first communication node 34-1 may be located on or proximate to one of the doors 28-1, 28-2, . . . 28-n of the vehicle 12. For example, the first communication node 34-1 may be located on the door 28-1 (e.g., driver's door) disposed on the driver's side 18a of the vehicle 12. In particular, the first communication node 34-1 may be disposed on or proximate to the handle 30 of the door 28-1 (e.g., driver's door) disposed on the driver's side 18a of the vehicle 12.

The second communication node 34-2 may be located within the cabin portion 29 of the vehicle 12. For example, the second communication node 34-2 may be located on or proximate to a console 36 disposed within the center (e.g., centrally disposed between the driver's side 18a and the passenger's side 18b) of the vehicle 12. In some implementations, the second communication node 34-2 is disposed between a driver's seat (not shown) and a passenger's seat (not shown) of the vehicle 12.

The third communication node 34-3 may be disposed on the passenger's side 18b of the vehicle 12. In some implementations, the third communication node 34-3 is located on or proximate to one of the doors 28-1, 28-2, . . . 28-n of the vehicle 12. For example, the third communication node 34-3 may be located on the door 28-2 (e.g., passenger's door) disposed on the passenger's side 18b of the vehicle 12. In particular, the third communication node 34-3 may be disposed on or proximate to the handle 30 of the door 28-2 (e.g., passenger's door) disposed on the passenger's side 18b of the vehicle 12.

The fourth communication node 34-4 may be located on a structural member of the vehicle 12. In some implementations, the fourth communication node 34-4 is located on the driver's side 18a of the vehicle 12. For example, the fourth communication node 34-4 may be located on a C-pillar 38a on the driver's side 18a of the vehicle 12.

The fifth communication node 34-5 may be located within the cabin portion 29 of the vehicle 12. In some implementations, the fifth communication node 34-5 is located in or proximate to a central portion of the vehicle 12. In this regard, the fifth communication node 34-5 may be disposed between the driver's side 18a and the passenger's side 18b of the vehicle 12. In particular, the fifth communication node 34-5 may be disposed within a headliner 40 of the vehicle 12.

The sixth communication node 34-6 may be located on or proximate to a structural member of the vehicle 12. In some implementations, the sixth communication node 34-6 is located on the passenger's side 18b of the vehicle 12. For example, the sixth communication node 34-6 may be located on or proximate to a C-pillar 38b on the passenger's side 18b of the vehicle 12.

The seventh communication node 34-7 may be located proximate the rear end 16b of the vehicle 12. For example, the seventh communication node 34-7 may be located on or proximate to a rear door 28-3 (e.g., trunk, hatch, tailgate, etc.) of the vehicle 12. In some implementations, the seventh communication node 34-7 is disposed on or proximate to an emblem 39 (e.g., an emblem representing the manufacturer of the vehicle 12) of the vehicle 12.

The eighth communication node 34-8 may be located on or proximate to a structural member of the vehicle 12. In some implementations, the eighth communication node 34-8 is located on the passenger's side 18b of the vehicle 12. For example, the eighth communication node 34-8 may be located on or proximate to the C-pillar 38b on the passenger's side 18b of the vehicle 12.

Each communication node 34-1, 34-2, 34-3, 34-4, 34-5, 34-6, 34-7, 34-8 may include an antenna 41 and an identification code or address (e.g., a BLE address). In some configurations, the eighth communication node 34-8 may be assigned as a main or primary communication node having a major BLE address. Accordingly, the eighth communication node 34-8 may be referred to herein as the "primary communication node 34-8." In this regard, the primary communication node 34-8 may be responsible for long-range communication between the vehicle access device 14 and the vehicle 12. In particular, the primary communication node 34-8 may be responsible for communicating with the vehicle access device 14 when the distance between the vehicle access device 14 and the vehicle 12 is greater than two meters. In some implementations, the primary communication node 34-8 may be responsible for communicating with the vehicle access device 14 when the distance between the vehicle access device 14 and the vehicle 12 is greater than ten meters.

The first, second, third, fourth, fifth, sixth, and seventh communication nodes 34-1, 34-2, 34-3, 34-4, 34-5, 34-6, 34-7 may be assigned as secondary BLE communication nodes, each having a minor BLE address. Accordingly, the first, second, third, fourth, fifth, sixth, and seventh communication nodes 34-1, 34-2, 34-3, 34-4, 34-5, 34-6, 34-7 may be referred to herein as "secondary BLE communication nodes 34-1, 34-2, 34-3, 34-4, 34-5, 34-6, 34-7." The minor BLE address of each of the secondary communication nodes 34-1, 34-2, 34-3, 34-4, 34-5, 34-6, 34-7 may be different than the minor BLE address of each of the other secondary communication nodes 34-1, 34-2, 34-3, 34-4, 34-5, 34-6, 34-7. Accordingly, the minor BLE addresses can allow the secondary communication nodes 34-1, 34-2, 34-3, 34-4, 34-5, 34-6, 34-7 to be differentiated from each other and from the primary communication node 34-8, which can help the vehicle access device 14 determine which of the communication nodes 34-1, 34-2, 34-3, 34-4, 34-5, 34-6, 34-7, 34-8 to communicate with when there is more than one vehicle 12.

Figure 2:
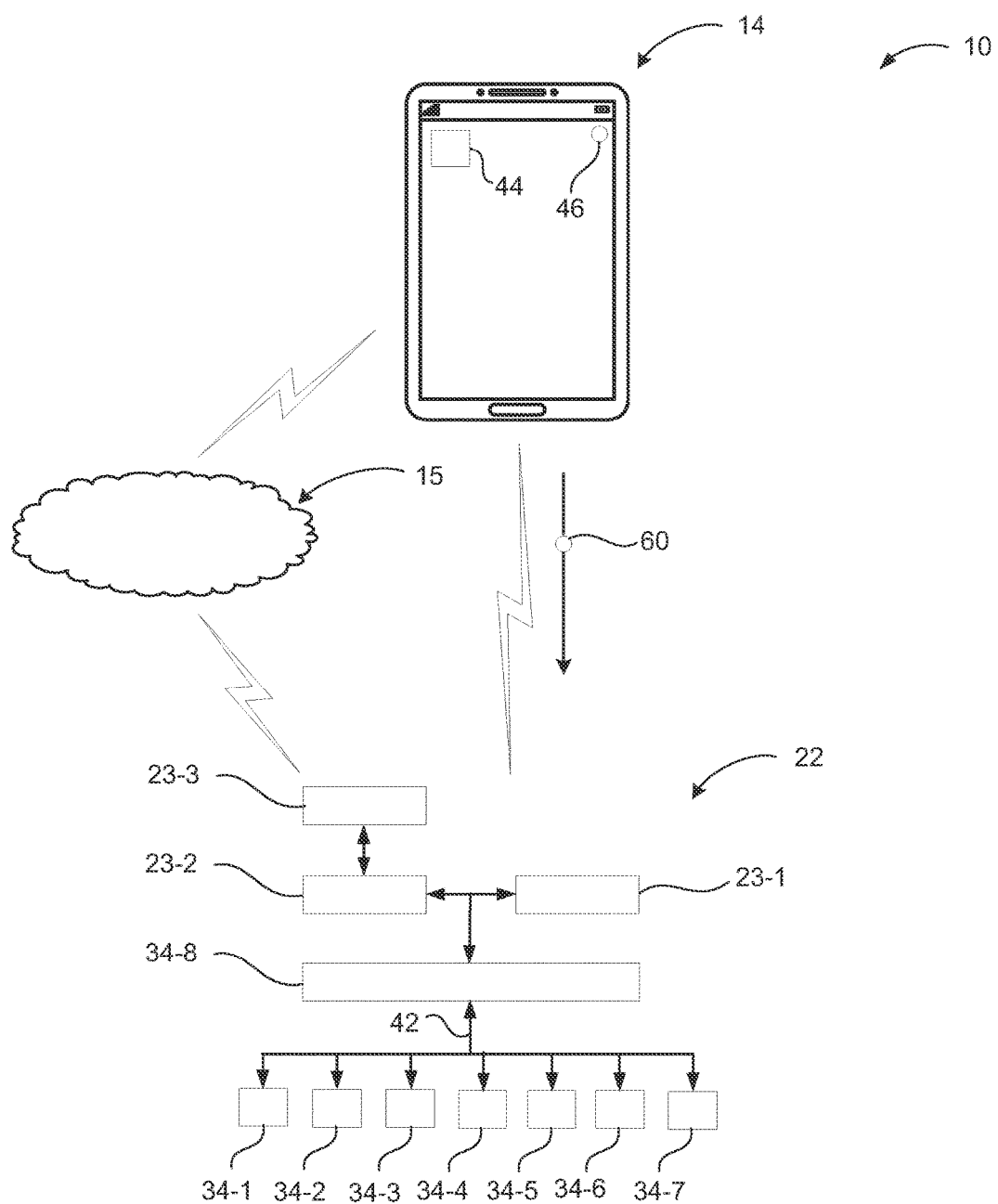
FIG. 2 is another functional block diagram of an example vehicle communication system according to the present disclosure.

With reference to FIG. 2, in some implementations, the secondary communication nodes 34-1, 34-2, 34-3, 34-4, 34-5, 34-6, and 34-7 communicate with the primary communication node 34-8 through a single, common communication line 42. The common communication line may include a common LIN node.

The antenna 41 may include at least one of a directional antenna and an omnidirectional antenna. For example, in some implementations, the first, second, third, fourth, fifth, sixth, and seventh communication nodes 34-1, 34-2, 34-3, 34-4, 34-5, 34-6, 34-7 include a directional antenna 41, while the eighth communication node 34-8 includes an omnidirectional antenna. In this regard, the antenna 41 disposed on each of the first, second, third, fourth, fifth, sixth, and seventh communication nodes 34-1, 34-2, 34-3, 34-4, 34-5, 34-6, 34-7 may produce and receive an energy radiation pattern that is focused in one or more directions, while the antenna 41 disposed on the eighth communication node 34-8 may produce and receive an energy radiation pattern that is focused in a plurality of directions. For example, the antenna 41 disposed on each of the first, second, third, fourth, fifth, sixth, and seventh communication nodes 34-1, 34-2, 34-3, 34-4, 34-5, 34-6, 34-7 may produce and receive an energy radiation pattern that is focused toward one of the front end 16a, the rear end 16b, the driver's side 18a, and the passenger's side 18b of the vehicle 12, while the antenna 41 disposed on the eighth communication node 34-8 may produce and receive an energy radiation pattern that is focused toward more than one of the front end 16a, the rear end 16b, the driver's side 18a, and the passenger's side 18b of the vehicle 12. In this regard, the antenna 41 disposed on the eighth communication node 34-8 may produce and receive an energy radiation pattern that is the same (e.g., symmetrical) in all horizontal directions.

In some implementations, the radiation pattern of the antenna 41 of the first communication node 34-1 extends from the first communication node 34-1 towards the driver's side 18a and/or away from the passenger's side 18b of the vehicle 12. The radiation pattern of the antenna 41 of the second communication node 34-2 may extend from the second communication node 34-2 towards the rear end 16b of the vehicle 12 and/or away from the front end 16a of the vehicle 12. The radiation pattern of the antenna 41 of the third communication node 34-3 may extend from the third communication node 34-3 towards the passenger's side 18b and/or away from the driver's side 18a of the vehicle 12. The radiation pattern of the antenna 41 of the fourth communication node 34-4 may extend from the fourth communication node 34-4 towards the driver's side 18a and/or away from the passenger's side 18b of the vehicle 12. The radiation pattern of the antenna 41 of the fifth communication node 34-5 may extend from the fifth communication node 34-5 towards the front end 16a of the vehicle 12 and/or away from the rear end 16b of the vehicle 12. The radiation pattern of the antenna 41 of the sixth communication node 34-6 may extend from the sixth communication node 34-6 towards the passenger's side 18b and/or away from the driver's side 18a of the vehicle 12. The radiation pattern of the antenna 41 of the seventh communication node 34-7 may extend from the seventh communication node 34-7 towards the rear end 16b of the vehicle 12 and/or away from the front end 16a of the vehicle 12.

As will be described in more detail below, in some implementations, the system 10 may implement a localization strategy using one or more of the communication nodes 34-1, 34-2, 34-3, 34-4, 34-5, 34-6, 34-7, 34-8. For example, the communication nodes 34-1, 34-2, 34-3, 34-4, 34-5, 34-6, 34-7, 34-8 may determine a location of the vehicle access device 14 based on a received single strength indication (RSSI) value (e.g., a calibration value) corresponding to a signal received from the vehicle access device 14. In other implementations, the communication nodes 34-1, 34-2, 34-3, 34-4, 34-5, 34-6, 34-7, 34-8 may determine a location of the vehicle access device 14 based on at least one of (i) the RSSI value, (ii) the angle at which a signal is received by, or transmitted from, the communication nodes 34-1, 34-2, 34-3, 34-4, 34-5, 34-6, 34-7, 34-8, and (iii) the time at which a signal is received by, or transmitted from, the communication nodes 34-1, 34-2, 34-3, 34-4, 34-5, 34-6, 34-7, 34-8.

The body control module 23-1 may control various aspects of accessing and/or operating the vehicle 12. For example, in some implementations, the body control module 23-1 may be configured to communicate with the access system 20 and/or the communication system 22 in order to permit or prevent access to the vehicle 12 through the doors 28. In some implementations, the body control module 23-1 may be, or otherwise include, an engine control module configured to permit or prevent access to the vehicle 12 via the engine (not shown). For example, the body control module 23-1 may permit or prevent the vehicle access device 14 from starting and/or otherwise operating the engine of the vehicle 12.

The communication nodes 34-1, 34-2, 34-3, 34-4, 34-5, 34-6, 34-7, 34-8 may communicate with the body control module 23-1 through one or more wired and/or wireless communication protocols, such as LIN Communication, CAN-FD communication, and/or K-Line communication. In some implementations, the secondary communication nodes 34-1, 34-2, 34-3, 34-4, 34-5, 34-6, and/or 34-7 communicate with the primary communication node 34-8, such that only the primary communication node 34-8 is in communication with the primary control module 23-1 via CAN communication protocol.

The gateway module 23-2 may be in communication with the communication system 22, the body control module 23-1, and the telematics control module 23-3 in order to route information from and between the communication system 22 and the cloud-based date center 15. In some implementations, the gateway module 23-2 is in communication with the body control module 23-1 and the telematics control module 23-3 through a CAN communication protocol.

The telematics control module 23-3 may be in communication with the gateway module 23-2 and the cloud-based data center 15. In some implementations, the telematics control module 23-3 includes a global positioning system unit (not shown) to determine the location of the vehicle 12. The telematics control module 23-3 may communicate with the gateway module 23-2 via CAN communication protocol (e.g., high speed CAN), and with the cloud-based data center through a wireless communication protocol (e.g., cellular data communication protocol).

The vehicle access device 14 may include a wireless communication device such as a key fob, a smartphone, a smart watch, or a computer (e.g., a tablet, laptop, personal digital assistant, etc.), for example. The vehicle access device 14 may include a communication application 44 and a wireless communication node 46. The communication application 44 may communicate with the communication application 32 of the vehicle 12 through the wireless communication node 46 and one or more of the communication nodes 34-1, 34-2, 34-3, 34-4, 34-5, 34-6, 34-7, 34-8 of the vehicle 12. For example, the vehicle access device 14 may use the communication application 44 to communicate through the wireless communication node 46 may with the eighth communication node 34-8. In some implementations, the wireless communication node 46 communicates with the eighth communication node 34-8 through one or more wireless communication protocols, such as short-range radio wave communication, Wi-Fi, BLUETOOTH®, and/or BLE. In this regard, the first wireless communication node 46 may be referred to herein as the BLE communication node 46.

With reference to FIGS. 3A-3E, a method for operating the system 10 is illustrated at 100. In this regard, as will be explained in more detail below, the method 100 may correspond to, or otherwise include, a method of accessing, operating, or otherwise communicating with the vehicle 12. For example, the method 100 may include determining the location of the vehicle access device 14 relative to the location of the vehicle 12, and allowing the vehicle access device 14 to communicate with the vehicle 12. In particular, the method 100 may include determining the location of the vehicle access device 14 relative to the vehicle 12, and allowing the vehicle access device 14 to access the vehicle 12 when the location of the vehicle access device 14 is within a predetermined distance of the vehicle 12.

Figure 3A:
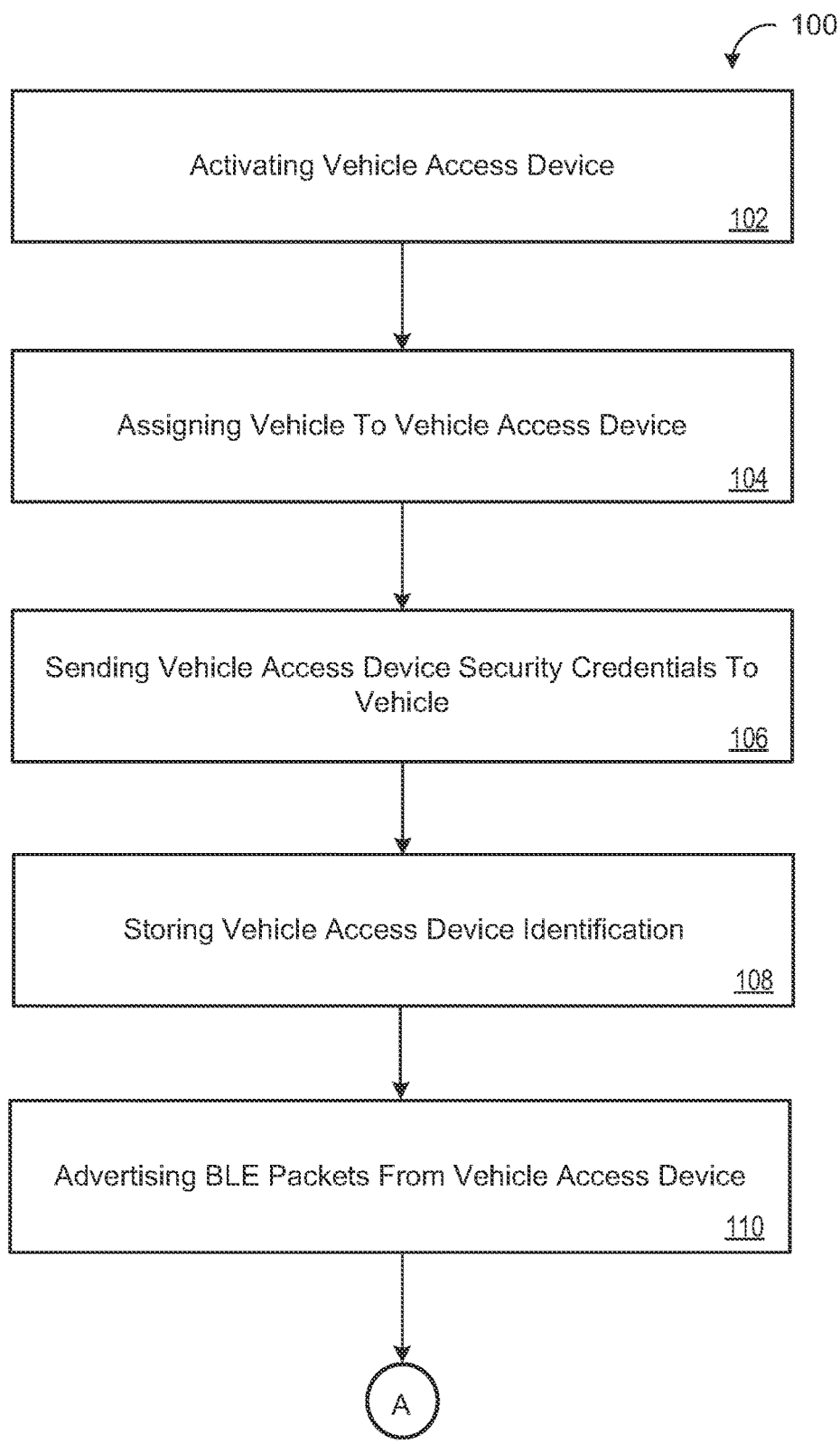
FIGS. 3A-3E are a flowchart depicting an example method of controlling a vehicle communication system according to the present disclosure.

With particular reference to FIG. 3A, at step 102, the method 100 may include activating the vehicle access device 14. For example, at step 102, an end user (e.g., an authorized user of the vehicle 12) may activate the communication application 44 on the vehicle access device 14.

At step 104, the method may include assigning a vehicle (e.g., vehicle 12) to the vehicle access device 14. For example, at step 104, the communication application 44 may register the vehicle 12 to one or more vehicle access device (e.g., vehicle access device 14). In particular, the method may include assigning to the vehicle access device 14 certain rights (e.g., rights to access, operate, or otherwise utilize) relative to the vehicle 12.

At step 106, the method may include sending security credentials (e.g., keys) to the vehicle 12. The security credentials may correspond to the vehicle access device 14 used to reserve the vehicle at step 104. For example, at step 106, a data center (e.g., cloud-based data center 25) may send the security credentials to the vehicle 12. In particular, the method may include transmitting the security credentials to one or more modules of the vehicle 12. For example, at step 106, the method may include transmitting the security credentials to the telematics control unit 23-3, the gateway module 23-2, and/or the body control module 23-1. Depending on the architecture (e.g., the security architecture) of the access system 20 and/or the communication system 22, as determined, for example, by the manufacturer of the vehicle 12, the security credentials may be transmitted to the telematics control module 23-3, the gateway control unit 23-2, and/or the body control module 23-1. For example, if the body control module 23-1 is configured to control access to the vehicle 12, the security credentials may be stored in the body control module 23-1, and the body control module 23-1 may transmit a key that is configured to decode an identification code of the particular vehicle access device(s) 14 that was registered to the vehicle 12 at step 104.

At step 108, method may include saving the identification code of the particular vehicle access device(s) 14 that was registered to the vehicle 12 at step 104. For example, at step 108, the primary communication node 34-8 may save the identification code of the vehicle access device 14.

At step 110, the method may include advertising (e.g., transmitting) information from the vehicle access device 14. For example, at step 110, the communication node 46 of the vehicle access device 14 may advertise BLE packets 60 (FIG. 1).

Figure 3B:
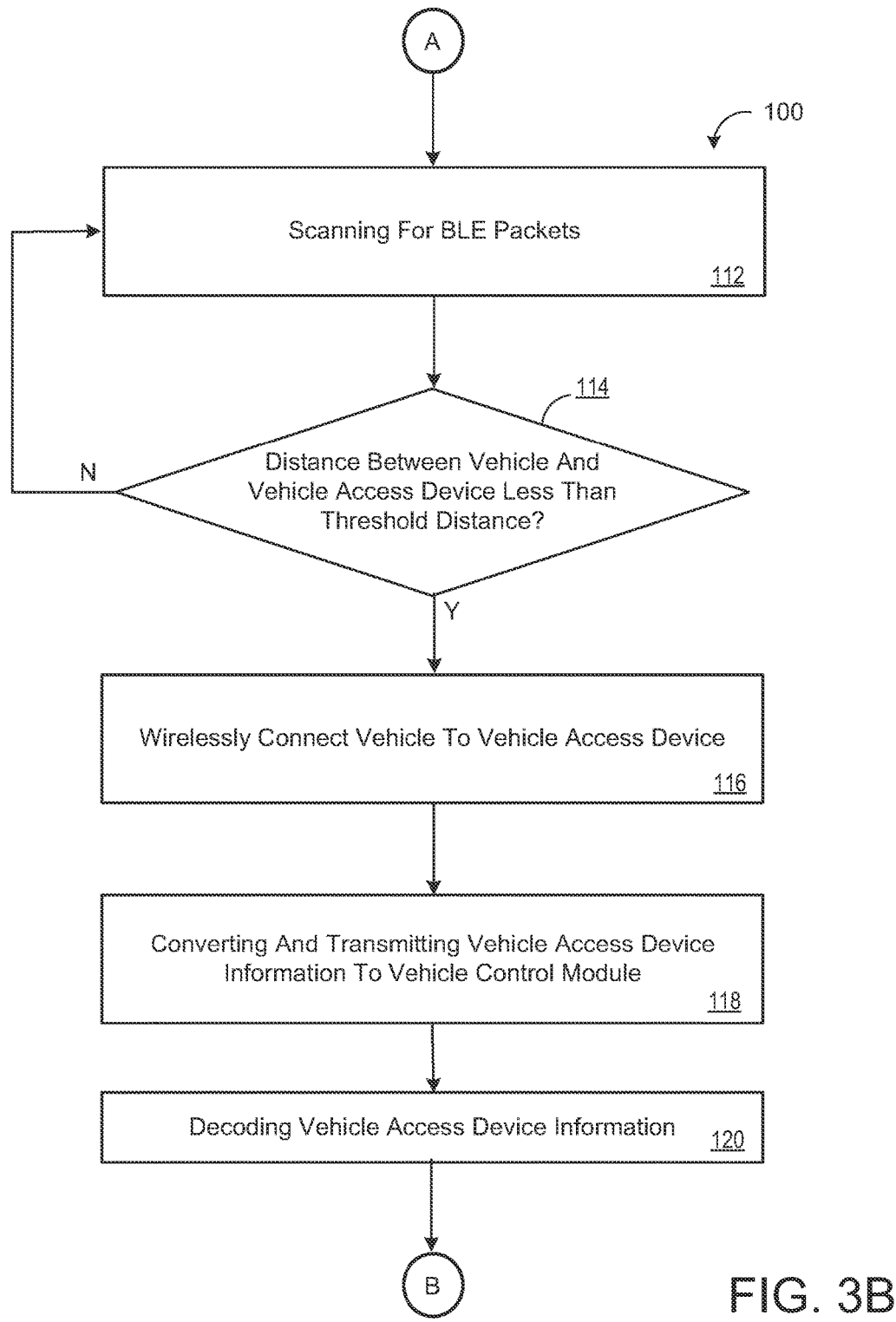

With particular reference to FIG. 3B, at step 112, the method may include searching for and/or receiving information transmitted from the vehicle access device 14. For example, at step 108, one or more of the communication nodes 34-1, 34-2, 34-3, 34-4, 34-5, 34-6, 34-7, and/or 34-8 on the vehicle 12 may start scanning for BLE packets transmitted from the vehicle access device 14, and/or receiving the BLE packet(s) 60 transmitted from the vehicle access device 14. In some implementations, the primary communication node 34-8 may scan for BLE packets 60 transmitted from the communication node 46 of the vehicle access device 14. In some implementations, the secondary communication nodes 34-1, 34-2, 34-3, 34-4, 34-5, 34-6, 34-7 may be in a low power mode (e.g., a sleep state) during step 112.

In some implementations, if the vehicle access device 14 is within a predetermined distance of the communication system 22 of the vehicle 12, the communication nodes 3434-1, 34-2, 34-3, 34-4, 34-5, 34-6, 34-7 may not decode the contents of the information (e.g., BLE packets 60) transmitted from the vehicle access device 14. Rather, if a registered vehicle access device (e.g., vehicle access device 14 registered at step 104) is within a predetermined distance of a registered vehicle, the body control module 23-1 or other security anchor in another control module (e.g., telematics control module 23-3 or gateway module 23-2) of the vehicle 12 may decode the contents of the information (e.g., BLE packets 60) transmitted from the vehicle access device 14.

At step 114, the method may include determining whether the vehicle access device 14 is within a first threshold distance of the vehicle 12. For example, at step 114, the method may include determining whether the vehicle access device 14 is less than or equal to one hundred meters (100 meters) from the vehicle 12. In this regard, the method may include determining whether the communication node 46 is within the first threshold distance of the primary communication node 34-8 of the vehicle 12. If step 114 is false, the method may return to 112. If step 114 is true, the method may proceed to step 116.

At step 116, the method may include connecting the vehicle 12 and the vehicle access device 14. For example, at step 116, the primary communication node 34-8 of the vehicle 12 and the wireless communication node 46 of the vehicle access device 14 may enter a wirelessly-connected state.

At step 118, the method may include converting the information (e.g., BLE packets 60) transmitted from the vehicle access device 14 to a different format and transmitting converted information to one of the control modules (e.g., body control module 23-1, telematics control module 23-3, or gateway module 23-2) of the vehicle 12. For example, at step 116, the method may include converting the BLE packets 60 to a Controller Area Network communication format or a Local Interconnect Network communication format and sending the converted information to the body control module 23-1.

At step 120, the method may include decoding the contents of the converted information transmitted at step 118. For example, at step 120, the body control module 23-1 may decode the converted BLE packets transmitted at step 118.

Figure 3C:
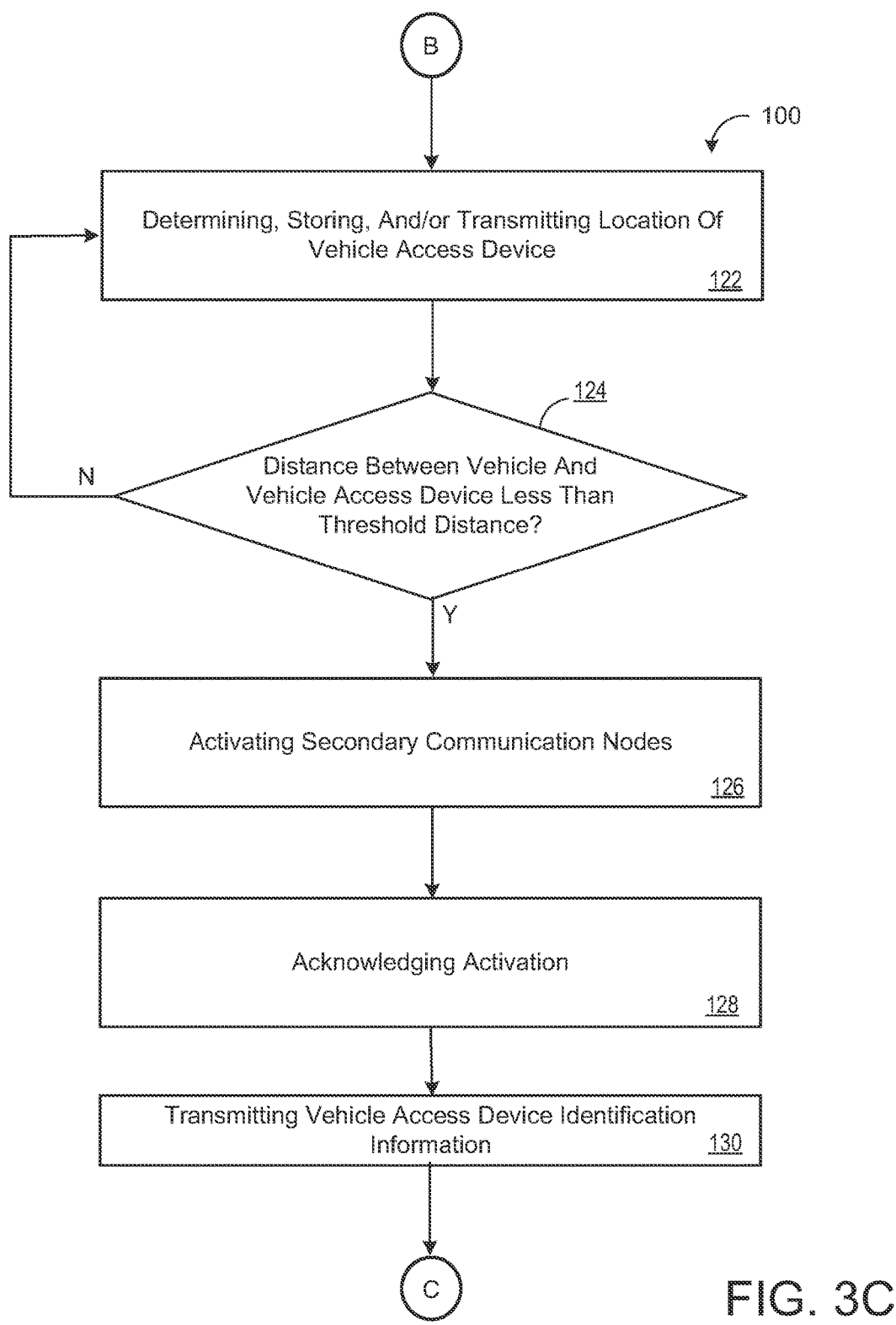

With particular reference to FIG. 3C, at step 122, the method may include determining, storing, and/or transmitting the location of the vehicle access device 14. For example, at step 122, the primary communication node 34-8 may determine, store, and/or transmit to the vehicle 12 an approximate location of the vehicle access device 14 relative to the vehicle 12. In particular, as the distance between the vehicle 12 and the vehicle access device 14 is reduced (e.g., as the user and the vehicle access device 14 approach the vehicle 12), at step 122, the primary communication node 34-8 may (i) determine and store the location of the vehicle access device 14 as such location changes relative to the vehicle 12, and (ii) transmit such location to a control module (e.g., body control module 23-1, telematics control module 23-3, gateway module 23-2, or other control module of the vehicle 12 that determines whether to permit the vehicle access device 14 to access the vehicle 12) of the vehicle 12.

At step 124, the method may include determining whether the vehicle access device 14 is within a second threshold distance of the vehicle 12. For example, at step 124, the method may include determining whether the vehicle access device 14 is less than or equal to ten meters (10 meters) from the vehicle 12. In this regard, the method may include determining whether the communication node 46 is within the second threshold distance of the primary communication node 34-8 of the vehicle 12. If step 124 is false, the method may return to 112. If step 124 is true, the method may proceed to step 126.

At step 126, the method may include activating one or more of the secondary communication nodes 34-1, 34-2, 34-3, 34-4, 34-5, 34-6, 34-7. For example, at step 126, the primary communication node 34-8 may transmit an activation signal to one or more of the secondary communication nodes 34-1, 34-2, 34-3, 34-4, 34-5, 34-6, 34-7. In some implementations, the primary communication node 34-8 may transmit the activation signal to the secondary communication nodes 34-1, 34-2, 34-3, 34-4, 34-5, 34-6, 34-7 facing an area surrounding the vehicle 12. The activation signal may wake up the one or more secondary communication nodes 34-1, 34-2, 34-3, 34-4, 34-5, 34-6, 34-7, causing the one or more secondary communication nodes 34-1, 34-2, 34-3, 34-4, 34-5, 34-6, 34-7 to transition from a sleep state to an active state.

At step 128, the method may include transmitting an acknowledgment signal from one or more of the secondary communication nodes 34-1, 34-2, 34-3, 34-4, 34-5, 34-6, 34-7. For example, at step 128, the one or more secondary communication nodes 34-1, 34-2, 34-3, 34-4, 34-5, 34-6, 34-7 activated at step 126 may send a signal to the primary communication node 34-8 acknowledging activation.

At step 130, the method may include transmitting identification information corresponding to the vehicle access device 14. For example, at step 130, the primary communication node 34-8 may transmit identification information of the vehicle access device 14 to one or more of the secondary communication nodes 34-1, 34-2, 34-3, 34-4, 34-5, 34-6, 34-7. The transmission of the identification information at step 130 may be either a secured or unsecured transmission, depending on the requirements of the communication system 22 of the vehicle 12.

Figure 3D:
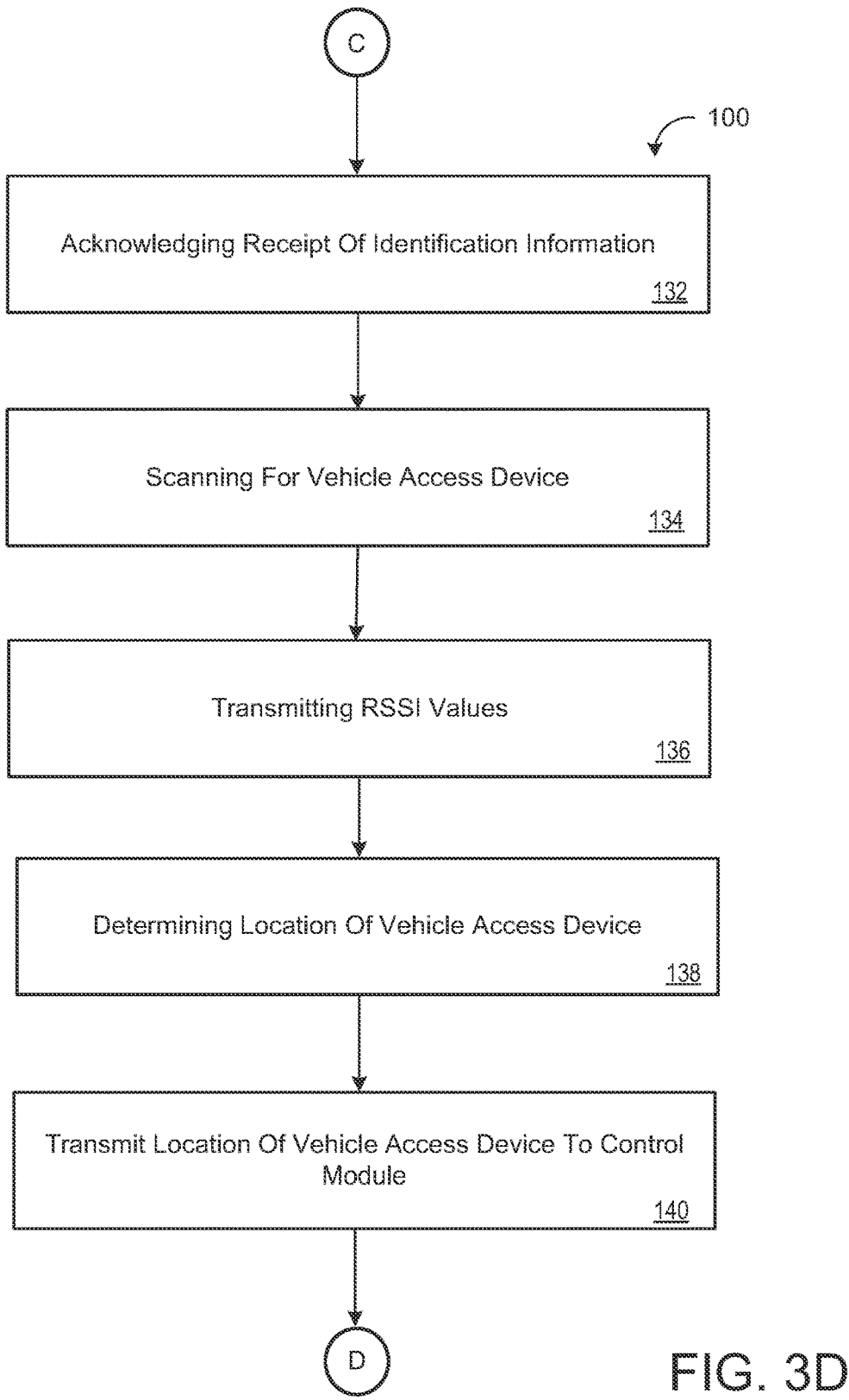

With particular reference to FIG. 3D, at step 132, the method may include transmitting an acknowledgment signal from one or more of the secondary communication nodes 34-1, 34-2, 34-3, 34-4, 34-5, 34-6, 34-7. For example, at step 132, the one or more secondary communication nodes 34-1, 34-2, 34-3, 34-4, 34-5, 34-6, 34-7 that received the identification information at step 130 may send a signal to the primary communication node 34-8 acknowledging receipt of the identification information.

At step 134, the method may include instructing one or more of the secondary communication nodes 34-1, 34-2, 34-3, 34-4, 34-5, 34-6, 34-7 to scan, or otherwise search, for the vehicle access device 14. For example, at step 134, the primary communication node 34-8 may command the one or more of the secondary communication nodes 34-1, 34-2, 34-3, 34-4, 34-5, 34-6, 34-7 to wirelessly search for information (e.g., BLE packets 60) transmitted from the vehicle access device 14 corresponding to the identification information transmitted at step 130. In particular, the secondary communication nodes 34-1, 34-2, 34-3, 34-4, 34-5, 34-6, 34-7 may (i) scan the RSSI data transmitted from the vehicle access device 14 corresponding to the identification information transmitted at step 130, (ii) gather the RSSI data and perform filtering to the group of RSSI gathered, and (iii) determine an RSSI value that will be used to perform the localization algorithm (e.g., determine an RSSI value that will be used to determine the location of the vehicle access device 14).

At step 136, the method may include transmitting filtered RSSI data to the primary communication node 34-8. For example, at step 136, the secondary communication nodes 34-1, 34-2, 34-3, 34-4, 34-5, 34-6, 34-7 may send the filtered RSSI data to the primary communication node 34-8. The secondary communication nodes 34-1, 34-2, 34-3, 34-4, 34-5, 34-6, 34-7 may send the filtered RSSI data to the primary communication node 34-8 upon request or automatically, depending on the communication protocol or medium used by and/or between communication system 22.

At step 138, the method may include determining the location of the vehicle access device 14 relative to the vehicle 12. For example, at step 138, the primary communication node 34-8 may utilize the filtered RSSI data received at step 136 to determine the location of the vehicle access device 14.

At step 140, the method may include transmitting the location of the vehicle access device 14 to one or more of the control modules of the vehicle 12. For example, at step 140, the primary communication node 34-8 may transmit the location of the vehicle access device 14 to the body control module 23-1. The primary communication node 34-8 may transmit the location of the vehicle access device 14 upon request (e.g., receipt of a request from the body control module 23-1) or upon a change of location of the vehicle access device. In this regard, at step 138, the secondary communication nodes 34-1, 34-2, 34-3, 34-4, 34-5, 34-6, 34-7 and/or the primary communication node 34-8 may continue monitoring the location of the vehicle access device(s) 14.

Figure 3E:
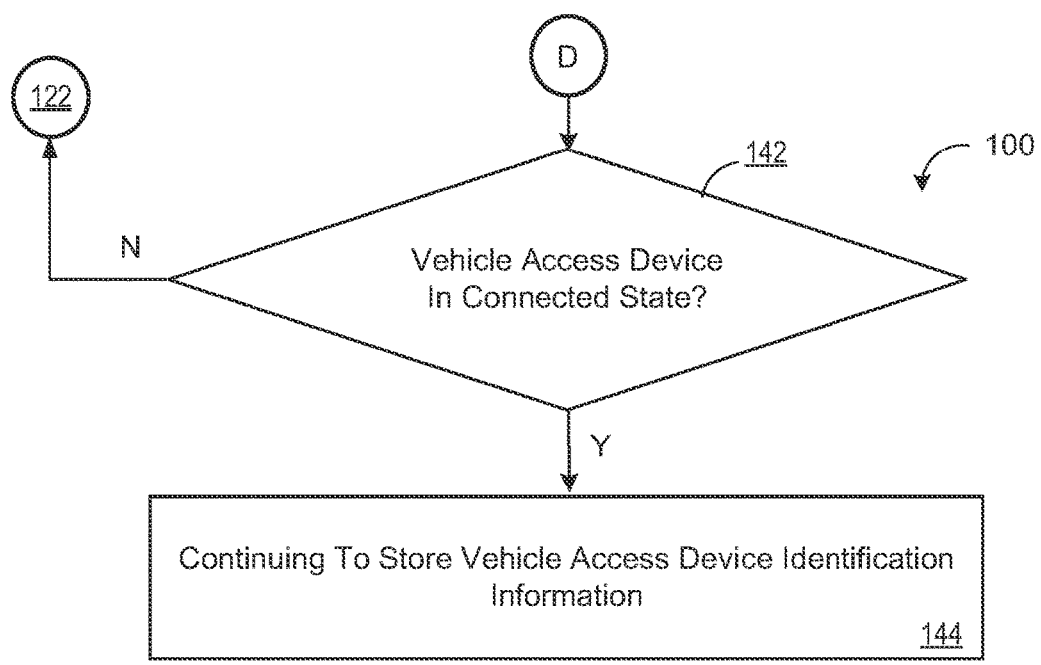

With particular reference to FIG. 3E, at step 142, the method may include determining whether the vehicle access device 14 is in communication, or otherwise in a connected state, with the vehicle 12. For example, at step 142, the primary communication node 34-8 may determine whether the vehicle access device 14 is in a connected state with the primary communication node 34-8.

If step 142 is false, the method may return to step 122, and the primary communication node 34-8 may transmit a signal to the secondary communication nodes 34-1, 34-2, 34-3, 34-4, 34-5, 34-6, 34-7 instructing the secondary communication nodes 34-1, 34-2, 34-3, 34-4, 34-5, 34-6, 34-7 to delete the identification information of the vehicle access device 14 transmitted at step 130. The method may further include acknowledging deletion of the identification information. For example, the secondary communication nodes 34-1, 34-2, 34-3, 34-4, 34-5, 34-6, 34-7 may transmit a signal to the primary communication node 34-8 acknowledging successful deletion of the identification information deleted pursuant to the instruction received at step 142. Deletion of the identification information of the vehicle access device 14 can mitigate the risk of the identification information being obtained by an unwanted device or user. If, upon returning to step 122, the method determines at step 124 that there is no vehicle access device(s) within second predetermined distance, the primary communication node 34-8 may command the secondary communication nodes 34-1, 34-2, 34-3, 34-4, 34-5, 34-6, 34-7 to enter into a low power mode (e.g., a sleep state). Upon detecting that the secondary communication nodes 34-1, 34-2, 34-3, 34-4, 34-5, 34-6, 34-7 are in the low power mode the primary communication node 34-8 may turn OFF the power supply (if available) to the secondary communication nodes 34-1, 34-2, 34-3, 34-4, 34-5, 34-6, 34-7 in order to further reduce the quiescent current of the communication system 22. The primary communication node 34-8 may also inform one of the control modules (e.g., body control module 23-1) of the vehicle 12 that there is no vehicle access device(s) 14 connected to, or otherwise in communication with, the communication system 22, such that the communication system 22 is ready to enter into the low power mode. In the low power mode, the primary communication node 34-8 may enter into scan mode (e.g., step 112), while the secondary communication nodes 34-1, 34-2, 34-3, 34-4, 34-5, 34-6, 34-7 may enter a sleep state.

In another implementation, the identification information may be stored in a secure memory of the secondary communication nodes 34-1, 34-2, 34-3, 34-4, 34-5, 34-6, 34-7, such that deletion of such identification information does not occur when the vehicle access device 14 is no longer in a connected state with the primary communication node 34-8.

If step 142 is true, the method may proceed to step 144, and the secondary communication nodes 34-1, 34-2, 34-3, 34-4, 34-5, 34-6, 34-7 may continue to store the identification information of the vehicle access device 14 as long as the vehicle access device 14 is in a connected state with the primary communication node 34-8. As long as the vehicle access device 14 is in a connected state with the primary communication node 34-8, one or more of the control modules (e.g., the body control module 23-1) of the vehicle 12 may instruct the access system 20 to perform one or more actions (e.g., unlock the doors of the vehicle 12, start the engine of the vehicle 12, etc.) requested by the vehicle access device 14.

Utilizing the method illustrated at FIGS. 2A-2E, the system 10 can effectively and efficiently determine whether the vehicle access device 14 is in communication with the vehicle 12, while also optimizing the amount of power consumed by the vehicle 12 and the vehicle access device 14.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method comprising:
determining a connection status between a vehicle access device and a vehicle, the vehicle having a primary communication node, a plurality of secondary communication nodes, and a control module, the primary communication node in communication with the plurality of secondary communication nodes through a common communication line;
transmitting identification information corresponding to the vehicle access device from the primary communication node to the secondary communication nodes through the common communication line based on whether the vehicle access device and the vehicle are in a connected state;
storing the identification information in a memory of at least one of the plurality of secondary communication nodes based on whether the vehicle access device and the vehicle are in a connected state; and
removing the identification information from the memory of the at least one secondary communication node based on whether the vehicle access device and the vehicle are in a disconnected state,
wherein the primary communication node, the plurality of secondary communication nodes, and the control module are disposed on the vehicle.

2. The method of claim 1, wherein the primary communication node and the plurality of secondary communication nodes include a Bluetooth Low Energy communication node.

3. The method of claim 1, wherein primary communication node is in communication with the control module.

4. The method of claim 3, wherein the primary communication node is in communication with the control module via a controller area network communication protocol.

5. The method of claim 1, wherein the primary communication node is in communication with the plurality of secondary communication nodes via a local interconnect network communication protocol.

6. The method of claim 1, further comprising transmitting, from one or more of the at least one secondary communication node to the primary communication node, a signal acknowledging removal of the identification information from the memory of the at least one secondary communication node.

7. The method of claim 1, further comprising storing the identification information in a memory of the primary communication node prior to storing the identification information in the memory of the at least one of the plurality of secondary communication nodes.

8. The method of claim 1, further comprising:
determining whether the vehicle access device is within a predetermined distance of the vehicle;
activating the at least one of the plurality of secondary communication nodes based on whether the vehicle access device is within the predetermined distance of the vehicle; and
transmitting, from the at least one of the plurality of secondary communication nodes to the primary communication node, a signal acknowledging activation of the at least one of the plurality of secondary communication nodes.

9. The method of claim 8, further comprising instructing, with the primary communication node, the at least one of the plurality of secondary communication nodes to scan for the vehicle access device.

10. The method of claim 9, further comprising:
receiving, with the at least one of the plurality of secondary communication nodes, received single strength indication values corresponding to the vehicle access device;
transmitting, from the at least one of the plurality of secondary communication nodes to the primary communication node, filtered received single strength indication values; and
determining, with the primary communication node, a location of the vehicle access device.

11. A communication system comprising:
a control module disposed on a vehicle;
a primary wireless communication node in communication with the control module and disposed on the vehicle; and
a plurality of secondary wireless communication nodes disposed on the vehicle, at least one of the plurality of secondary wireless communication nodes having a memory, wherein the primary wireless communication node is in communication with each of the plurality of secondary wireless communication nodes through a common communication line,
wherein the primary communication node is configured to transmit identification information corresponding to a vehicle access device to the secondary communication nodes through the common communication line based on whether the vehicle access device and a vehicle are in a connected state;
wherein the memory is configured to store the identification information based on whether the vehicle access device and the vehicle are in the connected state; and
wherein the memory is configured to remove the identification information based on whether the vehicle access device and the vehicle are in a disconnected state.

12. The system of claim 11, wherein the primary and secondary wireless communication nodes include Bluetooth Low Energy communication nodes.

13. The system of claim 11, wherein the common communication line includes a local interconnect network communication line.

14. The system of claim 11, wherein the primary communication node is in communication with the control module via a controller area network communication protocol.

15. The system of claim 11, wherein the primary wireless communication node is configured to communicate with a vehicle access device having identification information.

16. The system of claim 15, wherein the vehicle access device includes at least one of a key fob or a phone.

17. The system of claim 15, wherein the primary wireless communication node is configured to transmit the identification information to each of the secondary wireless communication nodes through the common communication line.

18. The system of claim 15, further comprising a gateway module in communication with the primary wireless communication node and the control module.

19. The system of claim 18, wherein the gateway module is in communication with the control module through a controller area network communication protocol.

20. The system of claim 18, wherein the control module includes a body control module, and wherein the system further comprises a telematics control module configured to communicate with the control module and the gateway module.

21. The method of claim 1, further comprising instructing, with the primary communication node, the at least one secondary communication node to remove the identification information from the memory of the at least one secondary communication node.

22. The system of claim 11, wherein the primary communication node is configured to instruct the at least one secondary communication node to remove the identification information from the memory of the at least one secondary communication node.

* * * * *